United States Patent [19]

Kunin

[11] 4,064,042

[45] Dec. 20, 1977

[54] PURIFICATION OF BLOOD USING PARTIALLY PYROLYZED POLYMER PARTICLES

[75] Inventor: Robert Kunin, Yardley, Pa.

[73] Assignee: Rohm and Haas Company, Philadelphia, Pa.

[21] Appl. No.: 654,261

[22] Filed: Feb. 2, 1976

Related U.S. Application Data

[63] Continuation-in-part of Ser. No. 550,486, Feb. 18, 1975, abandoned.

[51] Int. Cl.$^2$ .............................................. B01D 15/00
[52] U.S. Cl. .............................. 210/40; 210/DIG. 23
[58] Field of Search ....................... 210/22, 24, 39, 40, 210/DIG. 23; 252/421, 422, 425, 447; 423/445, 449; 260/2.1 R, 2.2 R, 2.5 D, 2.5 H, 2.5 HA, 2.5 HB

[56] References Cited

U.S. PATENT DOCUMENTS

| | | | |
|---|---|---|---|
| 3,463,728 | 8/1969 | Kolobow et al. | 210/22 |
| 3,794,584 | 2/1974 | Kunin | 210/22 |
| 3,888,250 | 6/1975 | Hill | 210/DIG. 23 |
| 3,901,808 | 8/1975 | Bokros | 210/DIG. 23 |

OTHER PUBLICATIONS

Winslow et al., Pyrolysis of Crosslinked Styrene Polymers, Journal of Polymer Science, vol. 22, pp. 315-324 (1956).

Dollimore et al., The Degradation of Selected Polymers to Carbons in an Inert Atmosphere, Carbon, vol. 5, pp. 65-72 (1967).

Japanese Kokai patent publication No. 49-53594, published May 24, 1974.

*Primary Examiner*—Frank A. Spear, Jr.
*Assistant Examiner*—Ivars Cintins
*Attorney, Agent, or Firm*—Louis F. Kline, Jr.

[57] ABSTRACT

Partially pyrolyzed particles of macroporous resinous polymer have improved structural stability and utility. Pyrolyzed preformed beads are useful as adsorbents in both gaseous and liquid media to remove impurities such as vinylchloride monomer from gases, aromatic compounds such as barbituates from blood, and phenolics from industrial waste streams. Pyrolyzed materials are also useful as catalysts in industrial and laboratory applications due to the controllable surface area and due to a variety of metals, among other things, that may be incorporated into the particles prior to pyrolysis. Preferred adsorbents are prepared from pyrolyzed beads of macroreticular ion exchange resins.

6 Claims, No Drawings

PURIFICATION OF BLOOD USING PARTIALLY PYROLYZED POLYMER PARTICLES

This application is a continuation in part of copending U.S. Ser. No. 550,486 filed Feb. 18, 1975, now abandoned.

This invention concerns partially pyrolyzed particles of resinous polymers for removing impurities from blood.

The most commonly used adsorbent today is activated carbon. The production of activated carbon for industrial purposes employs a wide variety of carbonaceous starting materials such as anthracite and bituminous coal, coke, carbonized shells, peat, etc. Suitability of such materials depends on a low ash content and availability in a uniform and unchanging quality.

Methods of activation can be considered in two categories. The first category includes "chemical activation" processes, in which the carbonaceous materials or sometimes the chars are impregnated with one or more activating agents such as zinc chloride, alkali carbonates, sulphates, bisulphates, sulfuric or phosphoric acid and then pyrolyzed (carbonized). The action of these materials appears to be one of dehydration with high yields of carbon unaccompanied by tarry materials. The second category includes processes known as "heat treatment" in which chars are heated to temperatures between 350° and 1,000° C in the presence of $CO_2$, $N_2$, $O_2$, HCl, $Cl_2$, $H_2O$ and other gases. A portion of the char is burned as the surface area and "activity" of the carbon increases. Via careful control of activation parameters, manufacturers are today able to produce high surface area products (800–2,000 $M^2/g$) in a wide range of uniform particle sizes.

Production of activated carbon by the above processes gives materials with the highest available carbon capacities for a wide variety of adsorbates in both the liquid and gas phases. However, these materials possess the following disadvantages:
 a. difficult and expensive thermal regeneration
 b. high regeneration losses of 10%/cycle
 c. friability of active carbon particles
 d. lack of control of starting materials Adsorbents produced according to the invention via pyrolysis of synthetic organic polymers are preferably spheres which possess a great deal of structural integrity. They do not easily break apart or or slough dust particles as is the case for active carbon. Because of this lack of friability, the regenerative losses are frequently lower than is common for active carbon.

Pyrolysis of synthetic organic polymers further allows a much greater degree of control of the starting materials and hence of the final product than is possible with naturally occurring raw materials used for production of activated carbons.

Incorporation of desirable elements and functional groups to enhance absorbency for specific adsorbates is easily achieved. Control of the average pore size and pore size distribution is much more easily achieved with well defined synthetic starting materials. This increased control allows the production of adsorbents designed for specific adsorbates with adsorbent capacities far greater than is possible with activated carbons.

The present invention provides partially pyrolyzed particles, preferably in the form of beads or spheres, produced by the controlled decomposition of a synthetic polymer of specific initial porosity. In a preferred embodiment, the pyrolyzed particles are derived from the thermal decomposition of macroreticular ion exchange resins containing a macroporous structure.

In general pyrolysis comprises subjecting the starting polymer to controlled temperatures for controlled periods of time under certain ambient conditions. The primary purpose of pyrolysis is thermal degradation while efficiently removing the volatile products produced.

The maximum temperatures may range from about 300° C to up to about 900° C, depending on the polymer to be treated and the desired composition of the final pyrolyzed particles. Higher temperature, e.g., about 700° C and higher result in extensive degradation of the polymer with the formation of molecular sieve sized pores in the product.

Most desirably, thermal decomposition (alternatively denoted "pyrolysis" or "heat treatment") is conducted in an inert atmosphere comprised of, for example, argon, neon, helium, nitrogen, or the like, using beads of macroreticular synthetic polymer substituted with a carbon-fixing moiety which permits the polymer to char without fusing in order to retain the macroreticular structure and give a high yield of carbon. Among the suitable carbon-fixing moieties are sulfonate, carboxyl, amine, halogen, oxygen, sulfonate salts, carboxylate salts and quaternary amine salts. These groups are introduced into the starting polymer by well-known conventional techniques, such as those reactions used to functionalize polymers for production of ion exchange resins. Carbon-fixing moieties may also be produced by imbibing a reactive precursor thereof into the pores of macroreticular polymer which thereupon, or during heating, chemically binds carbon-fixing moieties onto the polymer. Examples of these latter reactive precursors include sulfuric acid, oxidizing agents, nitric acid, Lewis acids, acrylic acid, and the like.

Suitable temperatures for practicing the process of this invention are generally within the range of 300° C to about 900° C, although higher temperatures may be suitable depending upon the polymer to be treated and the desired composition of the final pyrolyzed product. At temperatures above about 700° C the starting polymer degrades extensively with the formation of molecular sieve sized pores in the product, i.e., about 4 – 6 A average critical dimension, yielding a preferred class of adsorbents according to this invention. At lower temperatures, the thermally-formed pores usually range from about 6 A to as high as 50 A in average critical size. A preferred range of pyrolysis temperatures is between about 400° C and 800° C. As will be explained more fully hereinafter, temperature control is essential to yield a partially pyrolyzed material having the composition, surface area, pore structures and other physical characteristics of the desired product. The duration of thermal treatment is relatively unimportant, providing a minimum exposure time to the elevated temperature is allowed.

By controlling the conditions of thermal decomposition, in particular the temperature, the elemental composition, and most importantly the carbon to hydrogen atom ratio (C/H), of the final product particles is fixed at the desired composition. Controlled heat treatment yields particles intermediate in C/H ratio composition between activated carbon and the known polymeric adsorbents.

The following table illustrates the effect of maximum pyrolysis temperature on the C/H ratio of the final product, utilizing macroreticular functionalized polymers as the starting materials.

Table I

| Starting Material Compositon | Maximum Pyrolysis Temperature | C/H Ratio of Product |
|---|---|---|
| (1) Styrene/Divinylbenzene copolymer adsorbent (control) | | 1 |
| (2) Styrene/divinylbenzene ion exchange resin with sulfonic acid functionality (H+form) | 400° C | 1.66 |
| (3) Same as (2) | 500° C | 2.20 |
| (4) Same as (2) | 600° C | 2.85 |
| (5) Same as (2) | 800° C | 9.00 |
| (6) Activated carbon | | (negligible hydrogen) |

A wide range of pyrolyzed resins may be produced by varying the porosity and/or chemical composition of the starting polymer and also by varying the conditions of thermal decomposition. In general, the pyrolyzed resins of the invention have a carbon to hydrogen ratio of 1.5 : 1 to 20 : 1, preferably 2.0 : 1 to 10 : 1, whereas activated carbon normally has a C/H ratio much higher, at least greater than 30 : 1 (*Carbon and Graphite Handbook*, Charles L. Mantell, Interscience Publishers, N.Y. 1968, p. 198). The product particles contain at least 85% by weight of carbon with the remainder being principally hydrogen, alkali metals, alkaline earth metals, nitrogen, oxygen, sulfur, chlorine, etc., derived from the polymer or the functional group (carbon-fixing moiety) contained thereon and hydrogen, oxygen, sulfur, nitrogen, alkali metals, transition metals, alkaline earth metals and other elements introduced into the polymer pores as components of a filler (may serve as a catalyst and/or carbon-fixing moiety or have some other functional purpose).

The pore structure of the final product must contain at least two distinct sets of pores of differing average size, i.e., multimodal pore distribution. The larger pores originate from the macroporous resinous starting material which preferably contain macropores ranging from between about 50 to about 100,000 Angstroms in average critical dimension. The smaller pores, as mentioned previously, generally range in size from about 4 to about 50 A, depending largely upon the maximum temperature during pyrolysis. Such multimodal pore distribution is considered a novel and essential characteristic of the composition of the invention.

The pyrolyzed polymers of the invention have relatively large surface area resulting from the macroporosity of the starting material and the smaller pores developed during pyrolysis. In general the overall surface area as measured by $N_2$ adsorption ranges between about 50 and 1500 $M^2$/gram. Of this, the macropores will normally contribute about 6 to about 700 $M^2$/gram, preferably 6 – 200 $M^2$/g, as calculated by mercury intrusion techniques, with the remainder contributed by the thermal treatment. Pore-free polymers, such as "gel" type resins which have been subjected to thermal treatment in the prior art (see, e.g., East German Pat. Nos. 27,022, Feb. 12, 1964 and 63,768, Sept. 20, 1968) do not contribute the large pores essential to the adsorbents of the invention nor do they perform with the efficiency of the pyrolyzed polymers described herein. The following table illustrates the effect of macroporosity on product composition:

Table II

Adsorbents from sulfonated styrene/divinylbenzene copolymers with varying macroporosity

| Sample No. | Before Pyrolysis | | | Surface area ($m^2$/8) | After Pyrolysis Surface area |
|---|---|---|---|---|---|
| | Polymer type | % DVB | Aver. pore size A | | |
| 1 | non-porous | 8 | 0 | 0 | 32 |
| 2 | Macroporous | 20 | 300 | 45 | 338 |
| 3 | " | 50 | approx.100 | 130 | 267 |
| 4 | " | 80 | 50 | 570 | 570 |
| 5 | " | 6 | ~20,000 | 6 | 360 |

*All copolymers were sulfonated to at least 90% of theoretical maximum and heated in inert atmosphere to 800° C.

It may be noted from the data of Table II that the final surface area is not always directly related to the porosity of the starting material. The starting surface areas of the macroporous polymers span a factor of nearly 100 while the heat treated resins only differ by a factor of about 2. The non-porous "gel" resin has surface area well below the range of the starting materials of the invention and yielded a product with surface area substantially below the heat treated macroporous resin.

The duration of pyrolysis depends upon the time needed to remove the volatiles from the particular polymer and the heat transfer characteristics of the method selected. In general, the pyrolysis is very rapid when the heat transfer is rapid, e.g., in an oven where a shallow bed of material is pyrolyzed, or in a fluidized bed. To prevent burning of the pyrolyzed polymer, normally the temperature of the polymer is reduced to not more than 400° C. preferably not more than 300° C, before the pyrolyzed material is exposed to air. The most desirable method of operation involves rapid heating to the maximum temperature, holding the temperature at the maximum for a short period of time (in the order of 0 – 20 minutes) and thereafter quickly reducing the temperature to room temperature before exposing the sample. Products according to the invention have been produced by this preferred method by heating to 800° C and cooling in a period of 20 – 30 minutes. Longer holding periods at the elevated temperatures are also satisfactory, since no additional decomposition appears to occur unless the temperature is increased.

Activating gases such as $CO_2$, $NH_3$, $O_2$, $H_2O$ or combinations thereof in small amounts tend to react with the polymer during pyrolysis and thereby increase the surface area of the final material. Such gases are optional and may be used to obtain special characteristics of the adsorbents.

The starting polymers which may be used to produce the pyrolyzed resins of the invention include macroreticular homopolymers or copolymers of one or more monoethylenically or polyethylenically unsaturated monomers or monomers which may be reacted by condensation to yield macroreticular polymers and copolymers. The macroreticular resins used as precursors in the formation of macroreticular heat treated polymers are not claimed as new compositions of matter in themselves. Any of the known materials of this type with an appropriate carbon-fixing moiety is suitable. The preferred monomers are those aliphatic and aromatic materials which are ethylenically unsaturated.

Examples of suitable monoethylenically unsaturated monomers that may be used in making the granular macroreticular resin include: esters of acrylic and methacrylic acid such as methyl, ethyl, 2-chloro ethyl, propyl, isobutyl, isopropyl, butyl, tert-butyl, sec-butyl, ethylhexyl, amyl, hexyl, octyl, decyl, dodecyl, cyclohexyl, isobornyl, benzyl, phenyl, alkylphenyl, ethoxymethyl, ethoxyethyl, ethoxypropyl, propoxymethyl, propoxyethyl, propoxypropyl, ethoxyphenyl, ethoxybenzyl, ethoxycyclohexul, hydroxyethyl, hydroxypropyl, ethylene, propylene, isobutylene, diisobutylene, styrene, ethylvinylbenzene, vinyltoluene, vinylbenzylchloride, vinyl chloride, vinyl acetate, vinylidene chloride, dicyclopentadiene, acrylonitrile, methacrylonitrile, acrylamide, methacrylamide, diacetone acrylamide, functional monomers such as vinylbenzene, sulfonic acid, vinyl esters, including vinyl acetate, vinyl propionate, vinyl butyrate, vinyl laurate, vinyl ketones including vinyl methyl ketone, vinyl ethyl ketone, vinyl isopropyl ketone, vinyl n-butyl ketone, vinyl hexyl ketone, vinyl octyl ketone, methyl isopropenyl ketone, vinyl aldehydes including acrolein, methacrolein, crotonaldehyde, vinyl ethers including vinyl methyl ether, vinyl ethyl ether, vinyl propyl ether, vinyl isobutyl ether, vinylidene compounds including vinylidene chloride bromide, or bromochloride, also the corresponding neutral or half-acid half-esters or free diacids of the unsaturated dicarboxylic acids including itaconic, citraconic, aconitic, fumaric, and maleic acids, substituted acrylamides, such as N-monoalkyl-, -N,N-dialkyl-, and N-dialkylaminoalkylacrylamides or methacrylamides where the alkyl groups may have from one to eighteen carbon atoms, such as methyl, ethyl, isopropyl, butyl, hexyl, cyclohexyl, octyl, dodecyl, hexadecyl and octadecyl aminoalkyl esters of acrylic or methacrylic acid, such as $\beta$-dimethylaminoethyl, $\beta$-diethylaminoethyl or 6-dimethylaminohexyl acrylates and methacrylates, alkylthioethyl methacrylates and acrylates such as ethylthioethyl methacrylate, vinylpyridines, such as 2-vinylpyridine, 4-vinylpyridine, 2-methyl-5-vinylpyridine, and so on.

In the case of copolymers containing ethylthioethyl methacrylate, the products can be oxidized to, if desired, the corresponding sulfoxide or sulfone.

Polyethylenically unsaturated monomers which ordinarily act as though they have only one such unsaturated group, such as isoprene, butadiene, and chloroprene, may be used as part of the monoethylenically unsaturated category.

Examples of polyethylenically unsaturated compounds include: divinylbenzene, divinylpyridine, divinylnaphthalenes, diallyl phthalate, ethylene glycol diacrylate, ethylene glycol dimethacrylate, trimethylolpropanetrimethacrylate, divinylsulfone, polyvinyl or polyallyl ethers of glycol, of glycerol, of pentaerythritol, of diethyleneglycol, of monothio or dithio-derivatives of glycols, and of resorcinol, divinylketone, divinylsylfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, trivinylbenzene, trivinylnaphthalenes, and polyvinylanthracenes.

A preferred class of monomers of this type are aromatic ethylenically unsaturated molecules such as styrene, vinyl pyridine, vinyl naphthalene, vinyl toluene, phenyl acrylate, vinyl xylenes, ethylvinylbenzene.

Examples of preferred polyethylenically unsaturated compounds include divinyl pyridine, divinyl naphthalene, divinylbenzene, trivinylbenzene, alkyldivinylbenzenes having from 1 to 4 alkyl groups of 1 to 2 carbon atoms substituted in the benzene nucleus, and alkyltrivinylbenzenes having 1 to 3 alkyl groups of 1 to 2 carbon atoms substituted in the benzene nucleus. Besides the homopolymers and copolymers of these poly(vinyl) benzene monomers, one or more of them may be copolymerized with up to 98% (by weight of the total monomer mixture) of (1) monoethylenically unsaturated monomers, or (2) polyethylenically unsaturated monomers other than the poly(vinyl)benzenes just defined, or (3) a mixture of (1) and (2). Examples of the alkyl-substituted di- and tri-vinyl-benzenes are the various vinyltoluenes, the divinylethylbenzene, 1,4- divinyl - 2,3,5,6-tetramethylbenzene, 1,3,5- trivinyl - 2,4,6 - trimethylbenzene, 1,4-divinyl, 2,3,6 1 - triethylbenzene, 1,2,4-trivinyl - 3,5 - diethylbenzene, 1,3,5-trivinyl-2-methylbenzene.

Most preferred are copolymers of styrene, divinylbenzene and ethylvinylbenzene.

Examples of suitable condensation monomers include: (a) aliphatic dibasic acids such as maleic acid, fumaric acid, itaconic acid, 1,1-cyclobutanedicarboxylic acid, etc.; (b) aliphatic diamines such as piperazine, 2-methylpiperazine, cis, cis-bis (4-aminocyclohexyl) methane, metaxylylenediamine, etc.; (c) glycols such as diethylene glycol, triethylene glycol, 1,2-butanediol, neopentyl glycol etc.; (d) bischloroformates such as cis and trans - 1,4-cyclohexyl bischloroformate, 2,2,2,4-tetramethyl-1,3- cyclobutyl bischloroformate and bischloroformates of other glycols mentioned above, etc.; (e) hydroxy acids such as salicylic acid, m- and p-hydroxy-benzoic acid and lactones, derived therefrom such as the propiolactones, valerolactones, caprolactones, etc.; (f) diisocyanates such as cis and trans - cyclopropane -1, 2-diisocyanate, cis and trans-cyclobutane-1-2-diisocyanate etc.; (g) aromatic diacids and their derivatives (the esters, anhydrides and acid chlorides) such as phthalic acid, phthalic anhydride, terephthalic acid, isophthalic acid, dimethylphthalate, etc.; (h) aromatic diamines such as benzidine, 4,4'-methylenediamine, bis (4-aminophenyl) ether, etc.; (i) bisphenols such as bisphenol A, bisphenol C, bisphenol F, phenolphthalein, recorcinol, etc.; (j) bisphenol bis(chloroformates) such as bisphenol A bis(chloroformate), 4,4'-dihydroxybenzophenone bis(chloroformate) etc.; (k) carbonyl and thiocarbonyl compounds such as formaldehyde, acetaldehyde, thioacetone acetone, etc.; (l) phenol and derivatives such as phenol, alkylphenols, etc.; (m) polyfunctional crosslinking agents such as tri or poly basic acids such as trimellitic acid, tri or polyols such as glycerol, tri or polyamines such as diethylenetriamine; and other condensation monomers and mixtures of the foregoing.

Ion exhange resins produced from aromatic and/or aliphatic monomers provide a preferred class of starting polymers for production of porous adsorbents. The ion exchange resin may also contain a functional group selected from cation, anion, strong base, weak base, sulfonic acid, carboxylic acid, oxygen containing, halogen and mixtures of the same. Further, such ion exchange resins may optionally contain an oxidizing agent, a reactive substance, sulfuric acid, nitric acid, acrylic acid, or the like at least partially filling the macropores of the polymer before heat treatment.

The synthetic polymer may be impregnated with a filler such as carbon black, charcoal, bonechar, sawdust or other carbonaceous material prior to pyrolysis. Such fillers provide an economical source of carbon which may be added in amounts up to about 90% by weight of the polymer.

The starting polymers, when ion exchange resins, may optionally contain a variety of metals in their atomically dispersed form at the ionic sites. These metals may include iron, copper, silver, nickel, manganese, palladium, cobalt, titanium, zirconium, sodium, potassium, calcium, zinc, cadmium, ruthenium, uranium and rare earths such as lanthanum. By utilizing the ion exchange mechanism it is possible for the skilled technician to control the amount of metal that is to be incorporated as well as the distribution.

Although the incorporation of metals onto the resins is primarily to aid their ability to serve as catalytic agents, useful adsorbents may also contain metal.

Synthetic polymers, ion exchange resins whether in the acid, base or metal salt form are commercially available. According to the invention there is also provided an adsorption process for separating components from a gaseous or liquid medium which comprises contacting the medium with particles of a pyrolyzed synthetic polymer.

For example it has been discovered that a styrenedivinylbenzene based strongly acidic exchange resin pyrolyzed from any of the forms of Hydrogen, Iron (III), Copper(II), Silver(I) or Calcium(II) can decrease the concentration of vinylchloride in air preferably dry air from initial concentration of 2 ppm - 300,000 ppm to a level of less than 1 ppm at flow rates of 1 bedvolume/hour to 600 bedvolume/min. preferably 10 - 200 bedvolume/minute.

Compared to activated carbon the adsorbents of the invention show advantages such as a lower heat of adsorption, less polymerization of adsorbed monomers on the surface, less regenerant required due to diffusion kinetics, less loss of capacity upon multicycling and lower leakage before breakthrough. Similar performances have been noticed when other impurities such as $SO_2$ and $H_2S$ are removed. The adsorbents of the invention are particularly useful in the air pollution abatement field to remove components such as sulfur containing molecules, halogenated hydrocarbons, organic acids, aldehydes, alcohols, ketones, alkanes, amines, ammonia, acrylonitrile, aromatics, oil vapors, halogens, solvents, monomers, organic decomposition products, hydrogen cyanide, carbon monoxide and mercury vapors.

Specific chlorinated hydrocarbons include:
1,2,3,4,10 10-Hexachloro-1,4,4a,5,8,8a -hexahydro-1,4 endo-exo-5, 8-dimethanonaphthalene
2-Chloro-4-ethylamino-6-isopropylamino-s-triazine
  Polychlorobicyclopentadiene isomers Isomers of benzenehexachloride
60% Octochloro-4,7-methanotetrahydroindane
1,1-Dichloro-2,2-bis-)p-ethylphenyl)ethane
1,1,1-Trichloro-2,2-bis (p-chlorophenyl)ethane
Dichlorodiphenyl dichloroethylene
1,1-bis(p-Chlorophenyl)-2,2,2-trichloroethanol
2,2-Dichlorovinyl dimethyl phosphate
1,2,3,4,10, 10-Hexachloro-6, 7-epoxy-1,4,4a,5,6,-7 dimethanonaphthalene
1,2,3,4,10, 10-Hexachloro-6, 7-epoxy-1,4,4a,5,6,7,-8,8a-octahydro-1,4-endo-endo-5,8-dimethanonaphthalene
74% 1,4,5,6,7,8 8a-Heptachloro-32,4,7a-tetrahydro-4, 7-methanoindene
1,2,3,4,5,6-Hexachlorocyclohexane
2,2-bis(p-Methoxyphenyl)-1,1,1-trichloroethane
Chlorinated camphene with 67–69% chlorine Other components which may be adsorbed from liquids by the adsorbents of the invention include chlorinated phenols, nitro phenols, surface active agents such as detergents, emulsifiers, dispersants and wetting agents, hydrocarbons such as toluene and benzene, organic and inorganic dye wastes, color bodies from sugars, oils and fats, odiferous esters and monomers.

The adsorbents when exhausted may be regenerated. The particular regenerant most suitable will depend on the nature of the adsorbed species, but in general will include brine, solvents, hot water, acids and steam. The thermal regenerability of the adsorbents constitutes a distinct advantage.

ADSORBENTS WITHOUT ACTIVATION

Superior adsorbents are produced by this invention without the necessity of "activation" common to many carbonaceous adsorbents designated "active carbon." Adsorbents with properties both superior to and different from all other adsorbents are produced directly in one step by heat treating polymers as described above. Activation with reactive gases is an optional process sometimes desirable for the modification of adsorbent properties but is not a necessary part of the invention. As shown in Tables III and IV below, the adsorption properties are markedly influenced by the maximum temperature to which the resin is exposed. As shown in Table III a temperature of 500° C produces an adsorbent which is optimum for chloroform removal from water.

Resins heat treated to 800° C are capable of selectively adsorbing molecules according to size (see Table IV). The 800° C example is even more effective in selecting for hexane over carbon tetrachloride than indicated in Table IV since nearly all of the $CCl_4$ is adsorbed on the surface of the macropores and not in the micropores. The apparently superior selectivity of the commercial carbon molecular sieve (example 5) is clearly due to much less surface area in the macropores. The resin heat treated to 500° C (No. 1 in Table IV) shows much less selectivity for the two different sized molecules, emphasizing the important influence that the maximum temperature during heat treatment has on adsorbent properties.

Table III

Equilibrium Aqueous Chloroform Capacities for Various Adsorbents

All adsorbents in equilibrium with 2 ppm $CHCl_3$ in deionized water at room temperature.

| No. | Sample | Equilibrium capacity at 2 ppm |
|---|---|---|
| 1 | S/DVB polymeric adsorbent | 6.0 mg/g dry adsorbent |
| 2 | Pittsburgh Granular Activated Carbon | 10.2 |
| 3 | Sulfonated S/DBV resin pyrolyzed to 800° C | 21 |
| 4 | Same as No. 3 but oxygen activated | 28 |
| 5 | Same as No. 3 pyrolyzed to 500° C | 45 |

*S/DVB = Copolymer of styrene and divinylbenzene

Table IV

Molecular Screening Determination via Equilibrium Vapor Uptake

| No. | Sample | Capacity (ul/g) CCl$_4$[1] | Hexane[2] |
|---|---|---|---|
| 1 | Sulfonated S/DVB pyrolyzed to 500° C | 12.1 | 15.6 |
| 2 | Same as No. 1 pyrolyzed to 800° C | 3.4 | 15.7 |
| 3 | Pittsburgh Activated Carbon | 41.0 | 40.9 |
| 4 | Same as No. 2 oxygen etched | 17.6 | 22.7 |
| 5 | Carbon molecular sieve from Takeda Chemical Industries | 0.50 | 12.1 |

[1]Effective minimum size 6.1A
[2]Effective minimum size 4.3A

The following examples serve to illustrate but not limit the invention.

PROCESS EXAMPLES

Adsorption of Vinyl Chloride

Ten cubic centimeters of sample are placed in a 1.69 centimeter inner diameter stainless steel column. The bed depth is then 5.05 centimeters. Through the use of a dilution device with a mixing chamber, a gas stream of 580 ppm vinyl chloride in air is generated and passed through the column at a volumetric flow rate of 800 ml/min. The column flow rate is therefore 80 bed volumes/minute. All experiments are conducted at ambient temperature and a pressure of 16 psig. A flow of 10 ml/min is diverted from the effluent and fed into a flame ionization detector for continuous vinyl chloride analysis. Conventional Rohm

TABLE V

| Sample | Composition | Starting weight before pyrolysis | Pyrolysis Procedure | Surface Area m$^2$/g | Apparent Density g/cc |
|---|---|---|---|---|---|
| A | Fe$^{III}$ on Amberlite 200 | 10 gm. | Example I | 222 | 0.67 |
| B | Fe$^{III}$ on Amberlite XE-284 | 10 gm. | " | 540 | 0.62 |
| C | Cu$^{II}$ on Amberlite 200 | 10 gm. | " | 299 | .82 |
| D | Ag$^{I}$ on Amberlite 200 | 10 gm. | " | — | 1.07 |
| E | H on Amberlite 200 | 10 gm. | " | 490 | .62 |
| F | Ca$^{II}$ on Amberlite 200 | 10 gm. | " | — | .75 |
| G | H on Amberlite IR-120 | 10 gm. | " | 37 | 0.89 |
| H | H on Amberlite 200 | 250 gm. | Example II | 390 | — |
| I | H on Amberlite 200 | 675 gm. | Example I | 186 | — |
| J | Amberlite 200 in H$^+$ form | 521 gm. | " | | |
| K | H on Amberlite 200 | 20 gm. | " | | |

EXAMPLE 1

A 40 g sample of Amberlite 200 (registered Trademark of Rohm and Haas Company for a styrene/DVB sulfonic acid ion exchange resin) in the Na+ form (49.15% solids) was placed in a filter tube and washed with 200 cc of D. I. H$_2$O. 20 g of FeCl$_3$ .6H$_2$O were dissolved in about 1 l of D. I. H$_2$O and passed through the resin sample in a columnar manner over a period of about four hours. Uniform and complete loading could be observed visually. The sample was then washed with 1 l of D. I. H$_2$O, aspirated for 5 minutes and air dried for 18 hours.

10 grams of this sample was then pyrolyzed together with several other samples in a furnace equipped for input of 7 l of argon gas per minutes. The sample was raised to a temperature of 706° C over a period of 6 hrs. with step increases of about 110° C each hour. The sample was held at the maximum temperature for ½ hour. The power to the furnace was shut off and the furnace and contents were allowed to cool undisturbed to room temperature with the argon flowing continuously over the next 16 hours. The yield of solid material was 43% after pyrolysis. The physical characteristics of this sample are listed in Table V along with the data for Samples B through G, and I through K which were prepared in the same manner.

EXAMPLE 2

The technique of example I is modified in that 250 gm of Amberlite 200 in hydrogen form (obtained by converting the sodium form with hydrochloric acid) is pyrolyzed by raising the temperature continuously over 6 hours to 760° C. The sample is then allowed to cool over the next twelve hours after which it shows a surface area of 390 m$^2$/g.

and Haas adsorbents and a Calgon activated carbon are also tested. The results are shown below.

Table VI

Adsorption of Vinyl Chloride on Sample K, H+ Form, Pyrolyzed

| Elapsed Time (min) | Leakage (ppm VCM) | Instantaneous % Leakage |
|---|---|---|
| 0 | 0 | 0 |
| 25 | 0 | 0 |
| 50 | 0 | 0 |
| 75 | 0 | 0 |
| 100 | 0 | 0 |
| 125 | 0 | 0 |
| 150 | 0 | 0 |
| 166 | 1 | .1 |
| 200 | 34 | 5.8 |
| 225 | 242 | 42 |
| 250 | 454 | 78 |
| 275 | 569 | 98 |
| 300 | 580 | 100 |

Table VII

Adsorption of Vinyl Chloride on Sample B, Fe$^{(III)}$ Form, Pyrolyzed and Leached with H$_2$SO$_4$, Bed Volume - 20 cc

| Elapsed Time (min) | Leakage (ppm) | Instantaneous % Leakage |
|---|---|---|
| 0 | 0 | 0 |
| 25 | 0 | 0 |
| 50 | 0 | 0 |
| 75 | 0 | 0 |
| 100 | 0 | 0 |
| 109 | 1 | .2 |
| 125 | 284 | 49 |
| 150 | 521 | 90 |
| 175 | 568 | 98 |
| 200 | 580 | 100 |

Table VIII

Adsorption of Vinyl Chloride on Sample C, Cu$^{(II)}$ Form, Pyrolyzed

| Elapsed Time (min) | Leakage (ppm VCM) | Instantaneous % Leakage |
|---|---|---|
| 0 | 0 | 0 |
| 25 | 0 | 0 |
| 50 | 0 | 0 |
| 75 | 0 | 0 |

Table VIII-continued
Adsorption of Vinyl Chloride on Sample C, Cu$^{(II)}$ Form, Pyrolyzed

| Elapsed Time (min) | Leakage (ppm VCM) | Instantaneous % Leakage |
|---|---|---|
| 100 | 0 | 0 |
| 125 | 0 | 0 |
| 143 | 1 | 0.2 |
| 150 | 2 | 0.4 |
| 175 | 68 | 12 |
| 200 | 244 | 42 |
| 225 | 401 | 69 |
| 250 | 501 | 86 |
| 275 | 564 | 97 |
| 300 | 580 | 100 |

Table IX
Adsorption of Vinyl Chloride on Sample A, Fe$^{(III)}$ Form, Pyrolyzed

| Elapsed Time (min) | Leakage (ppm VCM) | Instantaneous % Leakage |
|---|---|---|
| 0 | 0 | 0 |
| 25 | 0 | 0 |
| 50 | 0 | 0 |
| 75 | 0 | 0 |
| 100 | 0 | 0 |
| 125 | 2.0 | 0.3 |
| 150 | 26 | 4.5 |
| 175 | 112 | 19 |
| 200 | 303 | 52 |
| 116 | 1 | 0.2 |

Table X
Adsorption of Vinyl Chloride on Pittsburgh PCB 12 × 30 Activated Carbon

| Elapsed Time (min) | Leakage (ppm) | Instantaneous % Leakage |
|---|---|---|
| 0 | 0 | 0 |
| 25 | 0 | 0 |
| 50 | 0 | 0 |
| 75 | 0 | 0 |
| 100 | 0 | 0 |
| 115 | 0 | 0 |
| 117 | 1 | 0.2 |
| 200 | 580 | 100 |

FURTHER PROCESS EXAMPLES

The adsorption is performed with a bed of 9.5 cc of Resin J which is subjected to a vinyl chloride influent stream containing 350 ppm and having a flow rate of 160 bed volumes per minute. Regeneration is carried out using steam at 130°–160° C for 20 minutes, followed by drying with air for 10 minutes. The experiment is performed for 15 cycles to show the lack of capacity loss over several cycles. Results are shown in the following table.

Table XI

| Cycle | Time* | Volume Capacity | Weight Capacity |
|---|---|---|---|
| 1 | 45 | 6.9 | 11.1 |
| 3 | 42 | 6.4 | 10.3 |
| 5 | 49 | 7.5 | 12.1 |
| 7 | 45 | 6.9 | 11.1 |
| 9 | 45 | 6.9 | 11.1 |
| 11 | 37 | 5.6 | 9.0 |
| 13 | 40 | 6.1 | 9.8 |
| 15 | 45 | 6.9 | 11.1 |

*Elapsed time at 1 ppm leakage in minutes

The results of comparative experiments on other commercial resins and carbon are shown in the following table.

Table XII

| Adsorbent | Volume Capacity (mg/cc) | Weight Capacity (mg/gm) |
|---|---|---|
| Sample D | 14.4 | 13.5 |
| Sample F | 9.8 | 13.1 |
| Sample G | 2.9 | 3.2 |
| Pittsburgh BPL 12 × 30 Activated Carbon | 8.5 | 17.0 |
| Kureha: Spherical Activated Carbon | 13.9 | 26.7 |
| Sample H$^{(III)}$ | 29.2 | 47.1 |
| Sample H$^{(I)}$ | 26.6 | 42.4 |
| Pittsburgh PCB 12 × 30 Carbon$^{(II)}$ | 7.6 | 16.8 |
| Pittsburgh PCB 12 × 30 Carbon$^{(IV)}$ | 11.4 | 25.3 |

$^{(I)}$Run with a 460 ppm influent concentration at 160 BV/min over a 10 cc sample
$^{(II)}$Run with a 350 ppm influent concentration at 160 BV/ml over a 10 cc sample
$^{(III)}$Run with a 1070 ppm influent concentration at 160 BV/min over a 10 cc sample
$^{(IV)}$Run with a 860 ppm influent concentration at 160 BV/min over a 10 cc sample It should be noted that sample H prepared by the procedure of Example II is a preferred embodiment.

Sample J when compared to PCB 12 × 30 carbon shows a smaller drop in capacity when the relative humidity is increased as shown herein below.

| R. Humidity | Volume Capacity mg/cc | |
|---|---|---|
| | PCB 12 × 30 | Sample J |
| 0 | 11.4 | 6.4 |
| 52 | 9.6 | 7.4 |
| 60 | 4.1 | 4.8 |
| 100 | — | 2.3 |

PHENOL ADSORPTION 20 cc of Sample I is subjected to an influent concentration of 500 ppm of phenol dissolved in D. I. water. The flow rate is 4 BV/hr. The sample shows a leakage of less than 1 ppm at 38 bed volumes. The sample's capacity is calculated to be 1.56 lbs./cubic ft. or 25.0 mg/gm at a leakage of 3 ppm.

Amberlite XAD-4 a commercial absorbent when used as a comparison shows a capacity of 0.9 lbs./cubic ft. or 14.4 mg/gm at a leakage of 6 ppm.

Sample I is regenerated with methanol at a rate of 2 BV/hr. and required 5 BV to be 71% regenerated.

Sample B is evaluated for adsorbent capacity for $H_2S$ and $SO_2$. The results indicate that significant amounts of both pollutants are adsorbed. Similar measurements for an activated carbon indicate a negligible adsorption of $SO_2$ at 100° C.

Synthetic organic polymers other than ion exchange resins have been evaluated for adsorbent capacity. A sample of polyacrylonitrile crosslinked with 15% divinyl benzene has been pryolyzed under a variety of experimental conditions and evaluated for $SO_2$ adsorbancy. The experimental conditions and results are presented in Table XIII Once again, significant quantities of $SO_2$ are adsorbed. Example N is of particular interest since an oxidation of the the copolymer in air prior to pyrolysis significantly increases the adsorption capacity of the pyrolyzed product for $SO_2$.

TABLE XIII

Adsorbent Capacity of Pyrolyzed Polyacrylonitrile Crosslinked with 15% Divinyl Benzene for $SO_2$

| Sample | Pyrolysis Conditions in argon | | | Yield | Surface Area | Saturation Capacity± | Regeneration* |
| --- | --- | --- | --- | --- | --- | --- | --- |
| | Max. Temp. | Time At Max. Temp. | Time to Max. Temp. | | | | |
| L | 570° C. | 1 hour | 5 hours | 54.4% | — | 0.20 m mole/g | 80% |
| M | 320° C. | 1 hour | 3 hours | 91.2% | — | 0.23 m mole/g | 73% |
| N** | 600° C. | 1 hour | 5 hours | 46.6% | 243 $M^2$/g | 0.60 m mole/g | 20% at 140° C. |

*Equilibrated at 70° C with 10% $H_2O$, 5% $O_2$, 85% $N_2$ input adsorbate concentration 2,000 ppm. $N_2$ at 200° C.
**Sample was steadily heated in air to 340° C over 3¼ hour period before pyrolysis.

CRUSH RESISTANCE

The physical integrity of beads of pyrolyzed polymers is greater than that of other spherical adsorbents and granular activated carbon as indicated in Table XIV. Superior resistance to fragmentation is expected to result in a greatly extended useful life compared to granular carbon for which attrition losses can be large. Also the lack of sloughage of particulate matter by the pyrolyzed polymers allows their use in applications for which activated carbon is unacceptable such as blood treatment.

TABLE XIV

Crush Strength Of Macroreticular Pyrolyzed Polymers And Other Adsorbents

| Description | No. | Type | Crush Strength[1] (Kg) |
| --- | --- | --- | --- |
| Sulfonated S/DVB heat treated under inert atmosphere to indicated temperature | 1 | +00° C | 2.3 |
| | 2 | 500° C | >3.1[2] |
| | 3 | 600° C | >3.4[2] |
| | 4 | 800° C | >3.4[2] |
| | 5 | 1000° C | >>3.6[3] |
| Spherical activated Carbon | 6 | Kureha | 0.93 |
| | 7 | Sample of unknown Japanese origin used for blood treatment experiments. | 0.51 |
| Granular Activated Carbon | 8 | Pittsburgh BPL[4] | ~0.90 |

[1]Mass which must be placed on upper of two parallel plates to fragment particle between plates-average of at least 10 trials
[2]Lower limit because at least one particle was not broken at maximum setting of 3.6 Kg.
[3]No beads were broken at maximum setting.
[4]Since particles are irregularly shaped, experiment was halted when a corner was knocked off.

I. CARBON FIXING MOIETIES

A wide variety of moieties have been shown to cause carbon fixation during pyrolysis. A partial list of moieties and the effectivenss of each is given in Table XV. The exact chemical nature of the moiety is unimportant since any group which serves to prevent volatilization of the carbon during pyrolysis is satisfactory for the process.

II. IMBIBED CARBON-FIXING AGENTS

Filling the pores of a macroreticular copolymer with a reactive substance prior to pyrolysis serves to prevent volatilization of the carbon in the copolymer. In the case of sulfuric acid the material has been shown to go through a sulfonation reaction during heating which produces a substance similar to the starting material of sample 1 in Table XV. The greater carbon yield obtained via imbibing rather than presulfonation is unexpected indicating the process may be superior to other techniques of carbon fixation.

III. IMPREGNATED POLYMERS

Impregnation is exemplified in No. 4 of Table XVI for which the pores of a carbon black containing S/DVB copolymer were filled with $H_2SO_4$ and pyrolyzed. The carbon yield is higher than the corresponding experiment (sample 1) performed without the presence of the carbon black.

TABLE XV

Carbon Fixing Moieties

| Resin | Moiety | Apparent Yield[1] | Carbon Yield[2] | Shape Retention |
| --- | --- | --- | --- | --- |
| S/DVB | Sulfonate | 37.0% | 66% | Yes |
| S/DVB | Carboxylate | 47.3% | 59% | Yes |
| S/DVB | Chloromethyl | 34% | 48% | Fair |
| AN/DVB | Nitrile | 33% | 73% | Yes |
| S/DVB | Amine | 20.2% | 30% | Fair |
| 4-Vinyl | Pyridine/DVB[3] | 21% | 26% | Fair |
| S/DVB | Carboxylate $Fe^{3+}$ Salt | 51% | 59% | Yes |
| S/DVB | Sulfonate $Fe^{3+}$ Salt | 51% | 77% | Yes |
| S/DVB | Gas Phase Chlorinated | 38.4% | 76% | Yes |
| S/DVB | Quaternary Amine Salt | 24% | 46% | Yes |

[1]Initial wt./final wt. × 100 after heating to at least 600° C.
[2]Percent of carbon in copolymer which remains after heating.
[3]Moiety is nitrogen contained in pyridine group.

TABLE XVI

Carbon Fixation Imbibing Agents

| Ex. No. | Copolymer | Imbibed Material | Apparent Yield | Carbon Yield | Shape Retention |
| --- | --- | --- | --- | --- | --- |
| 1 | S/DVB | 98% $H_2SO_4$ | 66.7 | 86% | Excellent |
| 2 | S/DVB | Polyacrylic Acid $Ni^{2+}$ Form | 42.4 | 91% * | Excellent |
| 3 | S/DVB | $AgNO_3$ | 32 | 41% | Excellent |
| 4 | S/DVB + Carbon-black ≠ | 98% $H_2SO_4$ | — | 94% | Excellent |

* Assuming all residual carbon comes from S/DVB and all the polyacrylic acid volatilizes.
≠ Impregnated during polymerization with 20% by weight of carbon black.

EXAMPLE 3

The following experiment produced sample No. 1 in Table XVI.

A sample of 30.79 g of the macroreticular copolymer (20% DVB/S) was placed in a 30mm O.D. quartz tube suitable for subsequent heat treatment. One end of the tube was blocked with quartz wool and the copolymer was piled on top of the quartz wool with the tube held vertically. Isopropanol, D.I. water and 98% $H_2SO_4$ (1l each) were passed in sequence through the resin over a 1.5 hr. period. Excess $H_2SO_4$ was drained during a 10 min. hold. Approximately 5.5 g of acid remained in the pores of the resin. The tube was placed horizontally in a tube furnace and $N_2$ passed through the tube at 4,800 cc/min. During heatings white smoke and then a reddish, pungent smelling oil were emitted from the sample. The final product was black, shiny, free flowing beads roughly the same size as the starting resin.

EXAMPLE 4

The following experiment produced sample 2 of Table XVI.

A benzoic acid copolymer was prepared from a chloromethylated resin (20% DVB/S) by nitric acid oxidation. A charge of 20.21 g of the solvent swelled and vacuum dried resin was placed in a quartz tube plugged at one end with quartz wool. The tube was held horizontally inside a Glas-col heating mantle and heated gradually to 800° C. over a period of 200 mins. The sample was cooled to room temperature within about 120 min. Nitrogen flowed through the tube during heating at a rate of 4800 cc/min. White smoke was emitted by the sample during heating. The final product consisted of shiny metallic black heads.

Typical multimodal pore size distribution of the pyrolyzed polymer particles is illustrated hereinbelow in Table XVII.

Table XVII

Pore Size Distribution of Styrene/Divinylbenzene (Amberlite 200) Macroreticular Pyrolyzed Polymers (cc/gram)

| Pore Size Range (A) | Not Pyrolyzed Amberlite 200 | Pyrolyzed (800° C) | (500° C) | O$_2$ Etched (800° C) | H$_2$SO$_4$ Imbibed (800° C) | Carbon Black-Impregnated/Sulfonated (800° C) |
|---|---|---|---|---|---|---|
| <4 | 0 | 0.05 | 0 | 0 | 0.06 | NM |
| 4–6 | 0 | 0.12 | 0 | 0.09 | 0.09 | 0.05 |
| 6–40 | 0 | 0 | 0.06 | 0.12 | 0.04 | 0 |
| 40–100 | 0.08 | 0 | 0.04 | 0.05 | 0 | 0.02 |
| 100–200 | 0.13 | 0.10 | 0.17 | 0.12 | 0.02 | 0.03 |
| 200–300 | 0.07 | 0.13 | 0.05 | 0.18 | 0.13 | 0.03 |
| 300–400 | 0 | 0 | | 0.02 | 0.10 | 0.08 |
| 400–800 | 0 | 0 | 0.02 | 0 | 0.18 | 0.45 |
| >800 | 0 | 0 | | 0 | 0 | 0.14 |

EXAMPLE 5

City tap water (Spring House, Pennsylvania) doped to about 1 ppm with CHCl$_3$ was passed, at a fast flow of 4 gal/cu ft. min., through three columns containing pyrolyzed styrene/divinylbenzene (Amberlite 200) pyrolyzed polymer connected in parallel to a common source. The effluent was collected and the CHCl$_3$ concentration measured by GC/EC analysis. The results given in Table XVIII show the 500° C sample out-performs control adsorbents by a wide margin. To check the reproducibility of these results a second batch of 500° C resin was tested under identical circumstances and performed significantly better than the first sample. The best 500° resin sample can treat about 14 times as many bed volumes of tap water compared to the granular activated carbon. The performance difference between the two 500° pyrolyzed resin samples may be related to the significantly lower oxygen content in the superior sample. Less oxygen is believed to lead to a more hydrophobic surface increasing the attractiveness of the surface for sparingly soluble organics like chloroform. Both steam and solvent have been shown to effectively regenerate the 500° C resins. Small columns of batch loaded resin were treated with steam and methanol and showed the same batch equilibrium capacity exhibited before regeneration. A second set of column experiments was performed following regeneration of the columns with 5 bed volumes of methanol. The results are included in Table XVIII. The second cycle capacities of the pyrolyzed resin (a) and polymeric adsorbent are higher than the first cycle indicating that, in addition to complete regeneration, the methanol removed some contaminants present at the start of the first cycle. The lower second cycle capacity for the activated carbon indicates incomplete regeneration. The pyrolyzed material is slightly less easily regenerated than XAD-4 requiring about 1 bed volume additional regenerant to achieve an equivalent degree of regeneration. Activated carbon is significantly less easily regenerated with only 62% regeneration after 5 bed volumes of methanol (calculated from ratio of first to second cycle capacities).

Table XVIII

Results of Column Studies for Removal of Chloroform from Tap Water 1 ppm CHCl$_3$ in Spring House tap water downflow at 4 gpm/cu ft at room temperature

| Cycle No. 1: | BV at 10% Leakage | Capacity to 10% Leakage |
|---|---|---|
| Adsorbent | | |
| Pyrolyzed Polymer (500° C) (a) | 6,150 | 12.3 mg/g |
| Pyrolyzed Polymer (500° C) (b) | 11,850 | 24.9 |
| Filtrasorb 300 (activated carbon) | 850 | 1.8 |
| XAD-4 (a commercial polymeric adsorbent) | 630 | 2.2 |
| Cycle No. 2: | | |
| Adsorbent | | |
| Pyrolyzed Polymer (500° C) (a) | 8,350 | 16.8 mg/g |
| Filtrasorb 300 (activated carbon) | 525 | 1.3 |
| XAD-4 | 1,175 | 4.0 |

EXAMPLE 6

Four pyrolyzed resins representative of different preparative techniques for styrene/DVB materials have been shown to have excellent batch equilibrium capacities for phenol as shown in Table XIX. These same resins were studied in column loading/regeneration cycles and the results are presented in Table XIX. One sample (oxygen etched) within experimental uncertainty maintains its column capacity for all three cycles. The other samples tested appear to be incompletely regenerated under the chosen regeneration conditions. Oxygen etching increases the batch and column phenol capacity only slightly compared to the unetched precursor but dramatically increases the regenerability. Creation of pores in the 6–40 A range by etching may increase the diffusion rate within the particles allowing more efficient regeneration.

Interestingly, the 500° C sample which was outstanding for chloroform removal had a low capacity for phenol. Since molecular sieve sized pores were present in the 800° C sample and absent in the 500° C material, the smallest pores are likely the active sites for phenol adsorption.

Table XIX

Phenol Capacities of Various Adsorbents
Loading - 1500 ppm phenol in D.I. Water at 4 BV/hr downflow at room temperature
Regeneration - 5 BV of acetone at 4 BV/hr downflow

| Sample | Description | Batch Equilibrium Capacity at 500 ppm (mg/g) | Cycle | Bed Vol. (ml) | Phenol Cap. at 1 ppm leakage g/l | lbs/cu ft |
|---|---|---|---|---|---|---|
| 1. Styrene/DVB | Oxygen etched (500° C) | 131 | 1 | 17.5 | 64 | 4.0 |
|  |  |  | 2 |  | 49 | 3.1 |
|  |  |  | 3 |  | 60 | 3.7 |
| 2. Styrene/DVB | (500° C) | 121 | 1 | 21.0 | 63 | 3.9 |
|  |  |  | 2 |  | 41 | 2.6 |
|  |  |  | 3 |  | 32 | 2.0 |
| 3. Styrene/DVB | Carbon black impregnated H₂SO₄ | 138 | 1 | 9.7 | 29 | 1.8 |
|  |  |  | 2 |  | 22 | 1.4 |
| 4. Styrene/DVB | H₂SO₄ imbibed | 96 | 1 | 10.2 | 21 | 1.3 |
|  |  |  | 2 |  | 20 | 1.2 |
| 5. XAD-4 | DVB polymeric adsorbent | ~70 | 1 |  |  | 2.0 |
|  |  |  | 7 |  |  | 2.0 |
|  |  |  | 12 |  |  | 2.0 |
| 6. Pittsburgh PCB | Granular activated carbon |  | 1 |  |  | 6.6 |
|  |  |  | 7 |  |  | 5.0 |
|  |  |  | 12 |  |  | 4.4 |

EXAMPLE 7

Pyrolyzed polymers have been studied for their capacity to adsorb certain undesirable blood components to determine their applicability in hemodialysis treatment of renal failure. A wide variety of styrene/DVB type pyrolyzed polymers have been evaluated. The results of batch experiments summarized in Table XX indicate that an oxygen etched sample has high capacity for uric acid adsorption. The degree of uric acid capacity corresponds to the volume of pores in the 6 – 40 A range created by oxygen etching Table XX Pyrolyzed polymer Batch Equilibrium Capacity for Uric Acid
Equilibrated at room temperature in aqueous phosphate buffer at pH 7.4 interpolated to 10 ppm

| No. | Description | Capacity at 10 ppm |
|---|---|---|
| 1 | Styrene/DVB etched | 18.4 mg/g |
| 2 | Pyrolyzed Sulfonated styrene/DVB (800° C) | 9.3 |
| 3 | Pyrolyzed Sulfonated styrene/DVB (800° C) | 9.0 |
| 4 | Pyrolyzed Sulfonated styrene/DVB (1000° C) | 8.5 |
| 5 | Pyrolyzed Sulfonated styrene/DVB (800° C) | 8.3 |
| 6 | Pyrolyzed Sulfonated styrene/DVB (800° C) | 8.2 |
| 7 | Pyrolyzed Sulfonated styrene/DVB H₂SO₄ imbibing to 800° C | 2.6 |
| 8 | Pyrolyzed Sulfonated styrene/DVB (larger macropores) (800° C) | 2.2 |
| 9 | Pyrolyzed Sulfonated styrene/DVB (500° C) | 1.2 |

EXAMPLE 8

Uric acid adsorption was determined for various samples of pyrolyzed polymer (all derived from Amberlite 200) from a 50 ppm solution of uric acid in 0.1 N phosphate buffer at pH 7.4. The uric acid solution was passed through a bed of 5 cc of polymer at a flow rate of 30 BV/hour upflow at a temperature of ~25° C. The results are summarized in Table XXI.

Table XXI

Uric Acid Adsorption from Buffered Solution
(50 ppm influent uric acid solution)

| Leakage after: | Sample 1 ppm | Sample 2 ppm | Sample 3 ppm |
|---|---|---|---|
| 30 minutes | 7.0 | 0.1 | 0.0 |
| 60 minutes | 11.0 | 0.1 | 0.0 |
| 120 minutes | 17.0 | 0.3 | 0.5 |
| 180 minutes | 22.2 | 0.9 | 2.0 |
| 240 minutes | — | 1.7 | 4.5 |

Pore distribution corresponding to above Sample Numbers Pore diameter A:

|  | Sample 1 | Sample 2 | Sample 3 |
|---|---|---|---|
| <4 | 0.08 | 0.0 | 0.05 |
| 4–6 | 0.12 | 0.09 | 0.04 |
| 6–40 | 0.0 | 0.12 | 0.12 |
| 4–100 | 0.0 | 0.05 | 0.01 |
| 100–200 | 0.08 | 0.12 | 0.17 |
| 200–300 | 0.13 | 0.18 | 0.07 |
| >300 | 0.0 | 0.02 | 0.01 |

I claim:

1. A process for separating an organic substance from blood which comprises contacting the blood with particles of a partially pyrolyzed macroporous synthetic polymer produced by the controlled thermal degradation of a macroporous synthetic polymer containing a carbon-fixing moiety and derived from one or more ethylenically unsaturated monomers, or monomers which are condensed to yield macroporous polymers, or mixtures thereof, which partially pyrolyzed macroporous synthetic polymer contains: (a) at least 85% by weight of carbon, (b) multimodal pore distribution with macropores ranging in size from about 50 A to about 100,000 A in average critical dimension, and (c) a carbon to hydrogen atom ratio of between about 1.5:1 and 20:1.

2. A process as claimed in claim 1 wherein the organic substance comprises an aromatic molecule.

3. A process as claimed in claim 1 wherein the organic substance includes uric acid.

4. A process as claimed in claim 1 wherein the organic substance includes a barbiturate.

5. A process as claimed in claim 1 wherein the organic substance includes creatinine.

6. A process as claimed in claim 1 wherein the partially pyrolyzed macroporous synthethic polymer contains pores of molecular seive size of about 2 – 10 A as well as macropores of larger sizes.

* * * * *